United States Patent
Raghunathan et al.

(10) Patent No.: US 10,764,336 B1
(45) Date of Patent: Sep. 1, 2020

(54) CONTROLLING TIMING OF DEDICATED-BEARER SETUP BASED ON BASE STATION LOAD

(71) Applicant: Sprint Spectrum L.P., Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 50 days.

(21) Appl. No.: 16/184,647

(22) Filed: Nov. 8, 2018

(51) Int. Cl.
*H04L 29/06* (2006.01)
*H04W 76/12* (2018.01)

(52) U.S. Cl.
CPC ...... *H04L 65/1026* (2013.01); *H04L 65/1016* (2013.01); *H04L 65/1069* (2013.01); *H04W 76/12* (2018.02)

(58) Field of Classification Search
None
See application file for complete search history.

(56) References Cited

U.S. PATENT DOCUMENTS

| 9,743,312 B1 | 8/2017 | Malhotra et al. | |
| 2012/0276945 A1* | 11/2012 | Chindapol | H04W 48/20 455/525 |
| 2015/0117344 A1* | 4/2015 | Arvidsson | H04L 5/0064 370/329 |
| 2015/0382267 A1* | 12/2015 | Wang | H04W 28/08 455/436 |
| 2017/0094565 A1* | 3/2017 | Sharma | H04W 76/18 |

OTHER PUBLICATIONS

G. Camarillo, et al., "Integration of Resource Management and Session Initiation Protocol (SIP)," Network Working Group, Oct. 2002.
ShareTechnote, "IMS/SIP—Precondition," http://sharetechnote.com/html/IMS_SIP_Precondition.html, printed from the World Wide Web Nov. 7, 2018.

\* cited by examiner

*Primary Examiner* — Anh Ngoc M Nguyen

(57) ABSTRACT

In a wireless communication system where a wireless access network includes a base station providing coverage in which to serve devices and where the wireless access network provides connectivity with an Internet Multimedia Subsystem (IMS), a method and system to help manage network resources by dynamically controlling when setup of a dedicated bearer will be invoked for a packet-based call placed by a device served by the base station. If the base station is lightly loaded, then setup of dedicated bearer could be invoked before the called party answers the call. Whereas, if the base station is heavily loaded, then setup of the dedicated bearer could be invoked if and when the called party has answered.

17 Claims, 4 Drawing Sheets

US 10,764,336 B1

CONTROLLING TIMING OF DEDICATED-BEARER SETUP BASED ON BASE STATION LOAD

BACKGROUND

A cellular wireless access network typically includes a number of base stations that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each base station could be coupled with a core network including a gateway system that provides connectivity with various application servers and/or transport networks, such as the public switched telephone network (PSTN) and/or the Internet for instance. With this arrangement, a UE within coverage of the access network could engage in air interface communication with a base station and could thereby communicate via the base station with various application servers and other entities.

Such an access network could operate in accordance with a particular air interface protocol (or radio access technology), with communications from the base stations to UEs defining a downlink or forward link and communications from the UEs to the base stations defining an uplink or reverse link.

In accordance with the air-interface protocol, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various "generations" of air-interface protocols, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

When a UE first enters into coverage of such an access network, the UE could detect coverage of a base station and then engage in random-access signaling and connection signaling with the base station in order to establish an air-interface connection (e.g., Radio Resource Control (RRC) connection) defining a logical tunnel for carrying communications wirelessly between the UE and the base station. Further, the UE could engage in attachment signaling via the base station with a control system of the access network. And the control system could responsively authenticate the UE and then engage in signaling to set up for the UE one or more default bearers defining logical tunnels for carrying data between the UE and the gateway system, to facilitate UE communication on one or more transport networks.

To facilitate voice over Internet Protocol (VoIP) service and other packet-based real-time communication services, an access network like this could provide connectivity with an Internet Multimedia Subsystem (IMS), which could include a call server and other components for setting up and connecting packet-based real-time media sessions for UEs. For instance, the gateway system of the access network could have a packet-switched communication interface with the IMS, so that a UE served by a base station can engage in packet-based communication with the IMS via the UE's established air-interface connection and a default bearer, and via the interface between the gateway system and the IMS. Further, the control system of the access network could have a packet-switched communication interface with the IMS, to allow for control signaling between the IMS and the access network.

In order to set up a packet-based real-time media session between the UE and a remote party via the IMS when the UE places a VoIP call or the like, the UE could engage in packet-based session-setup signaling, such as Session Initiation Protocol (SIP) signaling, with the IMS via the UE's air-interface connection and a default bearer through the access network, and the IMS could responsively engage in corresponding session-setup signaling with the remote party. Through this session-setup signaling, a packet-based real-time media session could thereby be established between the UE and the remote party, typically bridged through the IMS.

Further, to help ensure that content of the media session gets transmitted through the access network with an appropriate level of quality as it passes between the UE and the remote party, the IMS could engage in signaling with the access network, to arrange for the access network to set up a dedicated bearer for carrying content of the media session.

For example, the IMS could transmit to the control system of the access network a bearer-setup request message that identifies the UE (per the UE's session-setup signaling) and indicates a required bit rate, and the control system could then responsively work with the gateway system to invoke setup of a dedicated bearer supporting that bit rate (i.e., a guaranteed bit rate bearer) and other quality parameters. In response, further signaling could then pass between the components of the access network, ultimately resulting in creation of the dedicated bearer for the UE. And as part of this process, the base station could reserve appropriate resources to support the dedicated bearer.

Overview

Such a system could be configured with either of two timing-approaches for invoking setup of the dedicated bearer to carry content of the media session. In a first approach, setup of the dedicated bearer would be invoked before the called party answers the call, possibly with certain IMS signaling to the called party being conditioned on the dedicated bearer first being successfully set up. And in a second approach, setup of the dedicated bearer would be invoked only if and when the called party has answered the call. There are pros and cons of each approach.

The first approach could help to ensure that the dedicated bearer is set up in a timely manner, so that if and when the called party answers, the called party may perceive no delay before the call commences. Further, the first approach could help to avoid having the called party answer only to then find that dedicated-bearer setup had failed. However, the first approach has a downside in that, if the called party does not answer, then the dedicated-bearer setup process and associated resource-reservation would have been a waste.

The second approach, on the other hand, helps to avoid wastefully engaging in the dedicated bearer setup and associated resource-reservation in a situation where the called party does not answer. However, the second approach has a downside in that, if dedicated-bearer setup fails, then the called party who answered the call may perceive a call setup failure.

Disclosed herein is a mechanism to dynamically control which of these approaches is used in practice. The disclosure stems from a realization that setting up the dedicated bearer before the called party answers might negatively and unnecessarily impact other UEs, especially when the base station is heavily loaded. In particular, setting up the dedicated bearer before the called party answers would involve reserving associated resources earlier than setting up the dedicated bearer if and when the called party has answered and, as noted above, might be a waste of resources if the called party does not answer. While this may pose no issue when the base station is lightly loaded and has high resource availability, it could problematic when the base station is heavily loaded with low resource availability, as reserving resources for the dedicated bearer could restrict resource assignment and throughput for other UEs.

In accordance with the disclosure, the load of the base station will be determined, and one of the two approaches will be selected and applied based on the determined load. For instance, if and when the determined load is lower than a predefined threshold level, then, when a packet-based call is placed through the access network, from a UE served by a base station to a called party, setup of a dedicated bearer for the call could be invoked before the called party answers the call. Whereas, if and when the determined load is higher than the predefined threshold, then, when the packet-based call is placed through the access network, setup of the dedicated bearer for the call could be invoked once the called party has answered the call.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss example implementation in the context of a LTE system that provides connectivity with an IMS. It should be understood, however, that numerous variations from the details discussed will be possible in practice. For instance, the disclosed principles could extend to apply with respect to other types of networks, such as with other air-interface protocols (e.g., 5G NR or others noted above), and various system components and process steps could be added, removed, combined, distributed, re-ordered, or otherwise modified. In addition, it will be understood that operations described herein as being carried out by one or more entities could be carried out in various ways, such as by a processing unit programmed with software instructions and/or with various hardware and/or other components.

Figure 1:
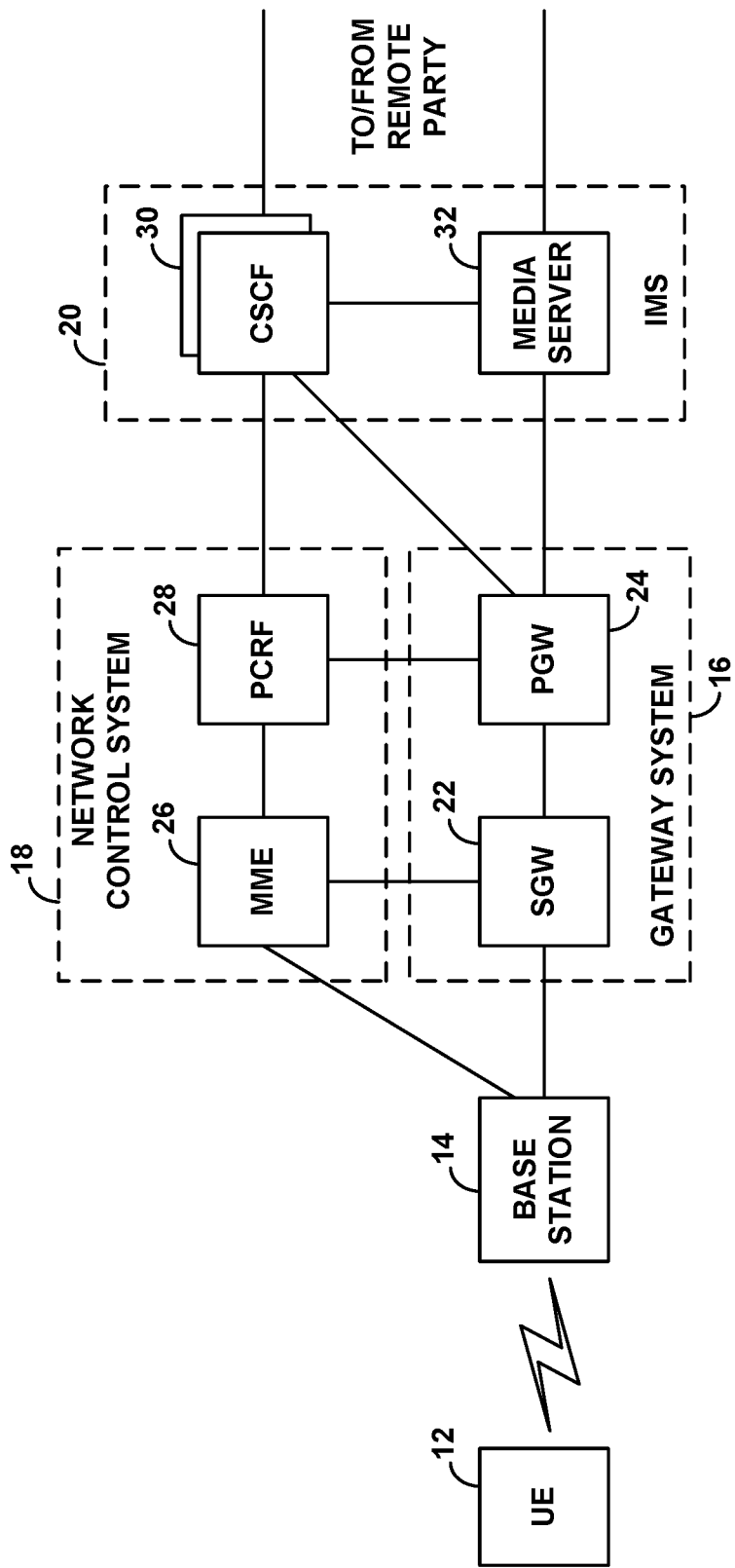
FIG. 1 is a simplified block diagram of an example network arrangement in which features of the present disclosure can be implemented.

Referring to the drawings, as noted above, FIG. 1 is a simplified block diagram of an example network arrangement in which the features of the present disclosure can be implemented. As shown in FIG. 1, the example arrangement includes a UE 12, a base station 14, a gateway system 16, a network control system 18, and an IMS 20.

The base station 14 may be an LTE evolved-Node-B (eNodeB) and could take the form of a macro base station, a small cell base station (e.g., femtocell and/or relay) or the like. As such, the base station could include an antenna structure, power amplifier, and associated components configured to provide a coverage area in which to serve UEs such as example UE 12. In accordance with LTE, the base station could serve the UE in a connected mode on one or more carriers, each of which spans a particular extent of frequency spectrum that defines a range of physical resource blocks every millisecond. When so serving the UE, the base station may schedule particular ones of those resource blocks for carrying bearer data to or from the UE. Further, if the base station is serving multiple UEs concurrently in the connected mode on such a carrier, the base station could apply a scheduling process to fairly distribute resource block allocation among the various UEs. In general, the greater the number of resource blocks the base station schedules for a UE per unit time, the higher the UE's data rate may be.

The gateway system 16 is then shown including a serving gateway (SGW) 22 and a packet data network gateway (PGW) 24, and the network control system 28 is shown including a mobility management entity (MME) 26 and a policy charging and rules function (PCRF) 28. As shown, these various network entities have communication interfaces with each other. For instance, the entities could all sit as nodes on a core packet network operated by a wireless service provider, and the illustrated interfaces may thus be logical packet-data connections through that network so that the entities can engage in IP communication with each other.

In operation, the gateway system 16 functions to provide connectivity with a transport network such as the public Internet or other packet-switched network so as to facilitate UE communication with entities on the packet-switched network. In particular, the SGW functions as an interface between the base station and the PGW, and the PGW functions to provide ultimate connectivity with the transport network. In the arrangement shown, the PGW (and thus the gateway system as a whole) thus provides for communication with the IMS 20. Further, the network control system 18 functions to control certain operations of the base station and gateway system. For instance, the MME functions to manage signaling between the base station and the SGW for setup of bearers, and the PCRF functions as a policy server to manage operation of the PGW.

The IMS 20 is then shown including one or more call session control functions (CSCFs) 30 and a media server 32, which may similarly sit as nodes on a packet-switched network. Further, the CSCFs are shown having interfaces with the PCRF and with the PGW, and the media server is shown having an interface with the PGW. In operation, the CSCFs function as advanced SIP proxy servers, to facilitate signaling for setup of packet-based real-time media sessions, and the media server may function to communicate packet-based real-time media (such as voice, video, or the like) with various served parties. The entities of the IMS could comprise servers or other nodes having network interface units, processing units, non-transitory data storage, and program instructions stored in the data storage and executable by the processing units to carry out various disclosed operations.

With this arrangement, when the UE first enters into coverage of the base station, the UE could engage in random-access signaling and RRC signaling with the base station to establish for the UE an RRC connection between the UE and the base station, and the UE could transmit via the RRC connection to the base station an attach request message, which the base station could forward to the MME.

After authorizing and authenticating the UE for service (e.g., through interaction with a home subscriber server and/or authentication center (not shown)), the MME could then engage in signaling with the base station and the SGW to set up one or more default bearers for the UE. Each bearer may have a particular service level, possibly designated by a Quality of Service Class Identifier (QCI) value, with a lowest QCI value corresponding with a highest service level such as a high guaranteed bit rate, and a highest QCI value corresponding with a lowest service level such as best-efforts communication. One such default bearer may be a best-efforts bearer for carrying general IP communications at low service level (e.g., QCI 8 or 9). Further, for a UE that subscribes to IMS service, another such default bearer may be an IMS signaling bearer for carrying SIP signaling between the UE and the IMS at a medium service level (e.g., QCI 5).

To set up each such bearer, the MME could work with the base station and SGW to establish a logical tunnel between base station and SGW, and the SGW could responsively work with the PGW to establish a logical tunnel between the SGW and the PGW.

For instance, the MME could engage in signaling with the SGW to determine for the bearer a tunnel endpoint at the SGW and to prepare the SGW to communicate over the tunnel at the desired service level. And the MME could transmit to the base station a bearer-setup request that specifies the SGW tunnel endpoint identity and the bearer service level, likewise preparing the base station to communicate over the tunnel at the desired service level. Further, the SGW could similarly engage in signaling with the PGW to establish for the bearer a tunnel between the SGW and the PGW and to prepare the PGW to communicate over the tunnel at the desired service level, and the PGW could assign an IP address for the UE, with the IP address then passing in return signaling to the base station for transmission in an attach response message to the UE.

Upon receipt of each such bearer-setup request from the MME (or a consolidated request for multiple such bearers being established at once), the base station could also work to manage air-interface resources for serving the UE consistent with the indicated bearer service level.

For instance, depending on the bit rate to be provided for the bearer, and considering the base station's level of load (e.g., how many other UEs the base station is currently serving, and so forth), the base station could decide that it would be appropriate to add one or more additional carriers to the UE's RRC connection (e.g., to increase the spectrum and thus the number of resource blocks that could be used for data communication to or from the UE) or to switch the UE's carrier to a different carrier (e.g., to provide different frequency bandwidth). To make any such changes to the UE's RRC connection, the base station could engage in RRC connection-reconfiguration signaling with the UE, to prepare the base station and UE to operate accordingly.

Once the UE is thus served by the base station in the connected mode (i.e., with an established RRC connection) and the UE has an IMS signaling bearer, the UE could engage in SIP signaling with the IMS to set up a packet-based real-time media session.

In the arrangement of FIG. 1, for instance, if the UE seeks to place a VoIP call to a remote called party, the UE could transmit to the IMS, via the UE's RRC connection and IMS signaling bearer, a SIP INVITE message requesting setup of the call. In that SIP INVITE message, the UE could identify the called party by a SIP address, a conventional telephone number, or another identifier that facilitates IMS signaling to set up the call to that party. This SIP INVITE message could then pass in the IMS to one or more proxy-CSCFs (P-CSCFs) and either that SIP INVITE message or an associated SIP INVITE message could pass from the IMS to the called device, which could cause the called device to ring or otherwise present an alert of the incoming call. Further, the called device could reply with a SIP 183 SESSION PROGRESS message or the like, which might lead to playout of ringback at the calling UE.

If and when the called party answers the call, the called device could then send a SIP 200 OK message to the IMS, and that 200 OK message or an associated 200 OK message could then pass from the IMS to the calling UE. And the UE could then respond with a SIP ACK message to the IMS, and that SIP ACK message or an associated SIP ACK message could then pass from the IMS to the called device. Through this SIP signaling, Real-time Transport Protocol (RTP) call legs could thereby be set up between the UE and the IMS and between the IMS and the called device, and media server 32 could operate to bridge those call legs together, so as to allow the UE and called party to communicate with each other.

As further noted above, to facilitate transporting the media content of this call (e.g., VoIP packets) between the UE and the remote party with sufficient quality, a dedicated bearer for the UE could be set up between the UE and the gateway system, and the media content passing between the UE and the remote party could be routed over this dedicated bearer. This dedicated bearer could be a QCI 1 bearer having an associated guaranteed bit rate, and the base station could thus reserve resources to ensure that it can accommodate that bit rate.

In a representative implementation, a P-CSCF of the IMS could engage in signaling with the PCRF 28 to arrange for setup of this dedicated bearer for the UE. In particular, the P-CSCF could transmit to the PCRF a bearer-setup request as a DIAMETER Rx message that identifies the UE and that specifies a bit rate needed for a dedicated QCI 1 bearer. And the PCRF could then transmit to the PGW an associated DIAMETER Rx message that directs the PGW to set up the bearer.

The PGW could then send an associated bearer-setup request to the SGW, the SGW could responsively send an associated bearer-setup request to the MME, and the MME could then responsively engage in bearer-setup signaling with the base station. And through this signaling, as in the process discussed above, a tunnel could be established for the bearer between the base station and the SGW and between the SGW and the PGW, with the base station, SGW and PGW being configured to communicate over the bearer at the indicated QCI level.

Further, in response to receipt from the MME of a bearer-setup request requesting set up of this bearer, the base station could manage its air-interface resource allocation to effectively extend the QCI 1 bearer to the air-interface connection between the base station and the UE. For instance, the base station could set itself to reserve a certain quantity of air-interface resources (and/or other base station resources) per unit time to help ensure that those resources will be available for use to carry bearer traffic on the QCI 1 bearer with a bit rate and/or other quality metrics required for the dedicated bearer.

As noted above, an issue addressed by the present disclosure is whether setup of the dedicated bearer for such a call (i) should be invoked before the called party answers the call, perhaps requiring successful setup of the dedicated bearer before certain session-setup signaling even goes to the called party or rather (ii) should be invoked if and when the called party has answered the call. In particular, at issue could be which of these approaches a communication system should be configured to use, such that when a call is placed from a served UE to a called party, the system would control invocation of dedicated-bearer setup accordingly.

Per the disclosure, the decision of which of these approaches to use will be based on an evaluation of load of the base station that is serving the UE or would serve the UE, such as a percentage utilization of air-interface resources defined by the base station coverage and/or a quantity of UEs currently connected with the base station, among other possibilities. In particular, if and when the base station's load is threshold low (or is not threshold high), the system could be configured such that setup of the dedicated bearer would be invoked before the called party answers the call, and if and when the base station's load is not threshold low (e.g., is threshold high), the system could be configured such that setup of the dedicated bearer would instead be invoked once the called party has answered the call.

In a representative implementation, the base station's load could be evaluated periodically or in response to one or more trigger events. When the base station's load is deemed to be threshold low, the access network and/or IMS could then be configured such that, for setup of a packet-based call through the access network, setup of the associated dedicated bearer will be invoked before the called party answers the call. Whereas, when the base station's load is deemed to not be threshold low, the access network and/or IMS could be configured such that, for setup of a packet-based call through the access network, setup of the associated dedicated bearer will be invoked once the called party has answered the call.

Load of the base station could be determined in various ways.

The base station itself could regularly evaluate its level of load. For instance, given the finite quantity of resource blocks or other air-interface resources defined by the base station's coverage (e.g., the carrier(s) on which the base station is configured to provide service), the base station could regularly evaluate the extent to which those resources have been occupied with scheduled data communications, such as a percentage utilization per unit time on a recent sliding-window basis. Alternatively or additionally, the base station could regularly evaluate how many UEs are RRC-connected connected with the base station, likewise on a recent sliding-window basis or the like. Further, the base station could regularly report these or other load metrics to a core-network server such as an element-management system (EMS).

Further, one or more other entities could determine the base station's load. For instance, the MME, PGW, PCRF, or IMS might determine the base station's load through signaling directly or indirectly with the base station or EMS. By way of example, such an entity could query the base station or EMS to determine the base station's load, or the base station or EMS could push to such an entity a report of the base station load. Other examples are possible.

Further, determining the base station's load could be based on current or recent information regarding utilization of the base station's resources or other such metrics. Or determining the base station's load could be based on historical load data, perhaps on a per-time-of-day or other schedule basis. For instance, if historical trend data shows that the base station tends to be heavily loaded at a particular times of day and tends to be lightly loaded at other times of day, then determining the base station's load could involve determining the current time of day and using the historical trend data to predict the base station's current level of load.

Based on an evaluation of the base station's load, a communication system comprising the access network and the IMS could then be configured such that, for a packet-based call placed from a UE to a called party, setup of a dedicated bearer for the call would be invoked with the timing as described here.

In an example implementation, given that the IMS will signal to the access network to request dedicated-bearer setup and given that the IMS will engage in session-setup signaling with the called party, this process could involve configuring the IMS with the desired timing. For instance, autonomously or in response to a request from the IMS, the access network could provide the IMS with an indication that causes the IMS to operate accordingly.

For example, upon determining that load of the base station is threshold low (e.g., lower than a predefined threshold level set by engineering design), the access network could transmit to the IMS an indication that will cause the IMS to operate in a mode in which the IMS will request dedicated-bearer setup before the called party answers. In practice, this indication could be tied to an identifier of the particular base station, and UE session setup signaling to the IMS could likewise include the identifier of the UE's serving base station, so that the IMS could know that, upon receiving such setup signaling from the UE, the IMS should request the access network to set up a dedicated bearer for the call without the IMS waiting for the called party to answer the call.

The indication provided to the IMS could be a Boolean flag or other value that the IMS will interpret to mean that the IMS should operate in the mode in which the IMS will request dedicated-bearer setup before the called party answers. Further, the indication could instead or additionally be an indication of the base station's load, and the IMS could be configured to determine based on the indicated base station load that the IMS should operate in this mode.

Various entities of the access network could provide this indication to the IMS, upon determining that the base station's load is threshold low. As an example, the PCRF could learn from the base station or from the EMS that the base station's load is threshold low and could responsively transmit this indication to a P-CSCF of the IMS, so that the P-CSCF could set itself (and thus the IMS) to operate accordingly. And as another example, the base station itself could determine that its load is threshold low and could responsively add the indication into the UE's call setup signaling to the IMS (e.g., into a header of a SIP INVITE message that is en route from the UE to the IMS for the call), thus piggybacking the indication onto that call-setup signaling. And the P-CSCF could read the indication from the call setup signaling and likewise set itself to operate accordingly.

In response to this indication, the IMS would thus set itself to operate in a mode in which it would request setup of a dedicated bearer for the call before the called party answers the call. For instance, in this mode, once a P-CSCF has received the UE's initial SIP INVITE message for the call, the P-CSCF could responsively signal to the PCRF to request setup of the dedicated bearer. Further, in this mode, the P-CSCF could wait for word from the access network that the dedicated bearer is set up before the P-CSCF then proceeds with further setup of the call, such as a condition for the P-CSCF transmitting a SIP INVITE message for the call to the called party. If and when the access network has set up the dedicated bearer, signaling could then pass in the access network to the PCRF as an indication that the bearer has been set up, and the PCRF could respond affirmatively to the IMS's bearer-setup request. And in response to that affirmative response from the PCRF, the P-CSCF could then proceed with call-setup signaling to the called party.

On the other hand, upon determining that load of the base station is not threshold low (e.g., at least as high as a predefined threshold level set by engineering design), the access network could transmit to the IMS an indication that will cause the IMS to operate in a mode in which the IMS will request dedicated-bearer setup only once the called party has answered the call. Here too, this indication could be tied to an identifier of the base station, and UE session-setup signaling could identify of the base station, so that the IMS could know that, upon receiving such setup signaling from the UE, the IMS should wait until the called party has answered the call before the IMS requests the access network to set up the dedicated bearer for the call.

Similarly here, the indication provided to the IMS could be a Boolean flag or other value that the IMS will interpret to mean that the IMS should operate in the mode in which the IMS will wait for the called party to answer before the IMS requests the access network to set up the dedicated bearer. Further, the indication could be an indication of the base station's load, and the IMS could be configured to determine based on the indicated load that the IMS should operate in this mode.

Various entities of the access network could provide this indication to the IMS, upon determining that the base statin's load is not threshold low (e.g., is threshold high). For instance, as discussed above, the PCRF could learn from the base station or from the EMS that the base station's load is threshold high and could responsively transmit the indication to a P-CSCF of the IMS, so that the P-CSCF could set itself to operate accordingly. And as another example, the base station itself could determine that its load is threshold high and could responsively add the indication into the UE's call setup signaling to the IMS, and the P-CSCF could read the indication from the call setup signaling and likewise set itself to operate accordingly.

In response to this indication, the IMS would thus set itself to operate in a mode in which the IMS would wait for the called party to answer before the IMS would request setup of a dedicated bearer for the call. For instance, in this mode, once the P-CSCF has received the UE's initial SIP INVITE message for the call, the P-CSCF could forward that SIP INVITE message or send an associated SIP INVITE message to the called party's device and could wait to receive a SIP 200 OK message from the called party's device indicating that the called party has answered the call. And in response to receiving that SIP 200 OK or other indication that the called party has answered the call, the P-CSCF could then signal to the PCRF to request setup of a dedicated bearer for the call.

In practice, controlling whether the communication system will invoke setup of a dedicated bearer for a UE-placed call before the called party answers the call or rather after the called party has answered the call could be carried out by one or more entities of the access network, at least by their signaling to the IMS to cause the IMS to operate accordingly. Alternatively, the controlling could be implemented by the IMS, based on such signaling from the access network for instance. Other implementations could be possible as well.

Figure 2:
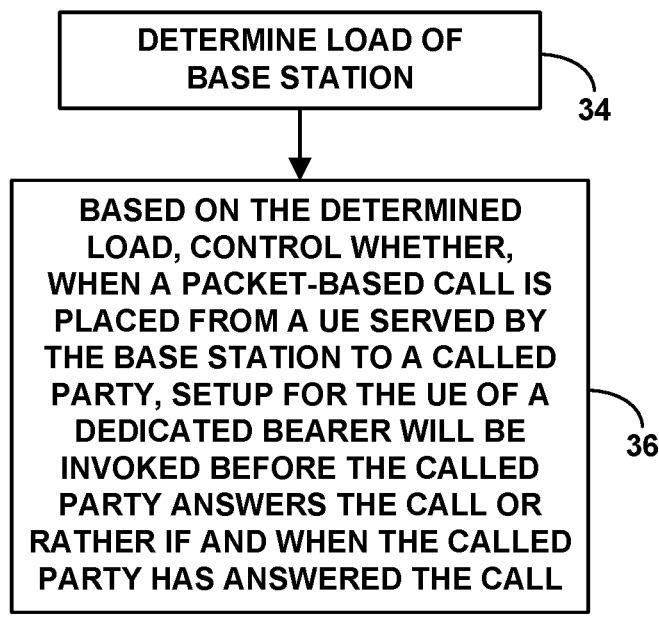
FIG. 2 is a flow chart depicting example operations that can be carried out in accordance with the disclosure.

FIG. 2 is next a flow chart depicting a method that can be carried out in accordance with the present disclosure, to help manage resources in a wireless access network that includes a base station providing coverage in which to serve UEs and that provides connectivity with an IMS. As shown in FIG. 2, at block 34, the method includes determining load of the base station. And at block 36, the method includes, based on the determined load, controlling whether, when a packet-based call is placed from a UE served by the base station to a called party, setup for the UE of a dedicated bearer to carry content of the call through the wireless access network will be invoked (i) before the called party answers the call or rather (ii) if and when the called party has answered the call.

In line with the discussion above, the act of controlling based on the determined load whether setup of the dedicated bearer will be invoked before the called party answers the call or rather if and when the called party has answered the call could involve (i) if the determined load is lower than a predefined threshold level, then causing setup of the dedicated bearer to be invoked before the called party answers the call and (ii) if the determined load is not lower than the predefined threshold level, then causing setup of the dedicated bearer to be invoked if and when the called party has answered the call.

Further, as discussed above, setup of the packet-based call from the UE to the called party could involve the UE engaging in call-setup signaling with the IMS via the wireless access network, the IMS being configured to send to the wireless access network a bearer-setup request to request setup of the dedicated bearer for the packet-based call. And controlling whether setup of the dedicated bearer will be invoked before the called party answers the call or rather if and when the called party has answered the call could involve controlling whether the IMS will send the bearer-setup request to the wireless access network (i) before the called party answers the call or rather (ii) if and when the called party has answered the call.

Further, as discussed above, the act of controlling whether the IMS will send the bearer-setup request to the wireless access network before the called party answers the call or rather if and when the called party has answered the call could involve transmitting to the IMS an indication of whether the IMS should send the bearer-setup request to the wireless access network before the called party answers the call or rather if and when the called party has answered the call. For instance, transmitting the indication to the IMS could involve transmitting the indication to the IMS in signaling between a control entity of the wireless access network (e.g., a PCRF, MME, or PGW) and a control entity of the IMS (e.g., a P-CSCF). Further, the transmitting of the indication to the IMS could involve piggybacking the indication onto the call-setup signaling in which the UE engages with the IMS.

In an example implementation, at least the controlling of whether setup of the dedicated bearer will be invoked before the called party answers or rather if and when the called party has answered could be carried out in response to the packet-based call being placed to the called party. For instance, when a UE places the packet-based call, the access network and/or IMS could then use load of the UE's serving base station as a basis to decide whether setup of a dedicated bearer for the call should be invoked before the called party answers or rather if and when the called party has answered, and could operate accordingly.

Further, in an example implementation, the method could be carried out periodically. For instance, the access network and/or IMS could periodically determine the load of the base station and, based on the determined load, could configure themselves such that when a UE places a packet-based call to a called party, setup of a dedicated bearer for the call would be invoked before the called party answers or rather if and when the called party has answered.

In addition, in line with the discussion above, the coverage provided by the base station could define air-interface resources for carrying communications, and the act of determining the load of the base station could involve determining a percent utilization of the air-interface resources, such as over a recent sliding window or on a scheduled basis for instance. Alternatively or additionally, the act of determining the load of the base station could involve determining a quantity of UEs currently served by the base station.

And yet further, as discussed above, the act of invoking setup of the dedicated bearer before the called party answers the call could involve using setup of the dedicated bearer as a precondition for call-setup signaling to the called party. For instance, the IMS could be configured to wait for notification that the dedicated bearer has been successfully set up before the IMS engages in call-setup signaling to set up a call leg with the called party. With this implementation, if dedicated bearer setup fails, then the IMS would not engage in such call-setup signaling with the called party.

Figure 3:
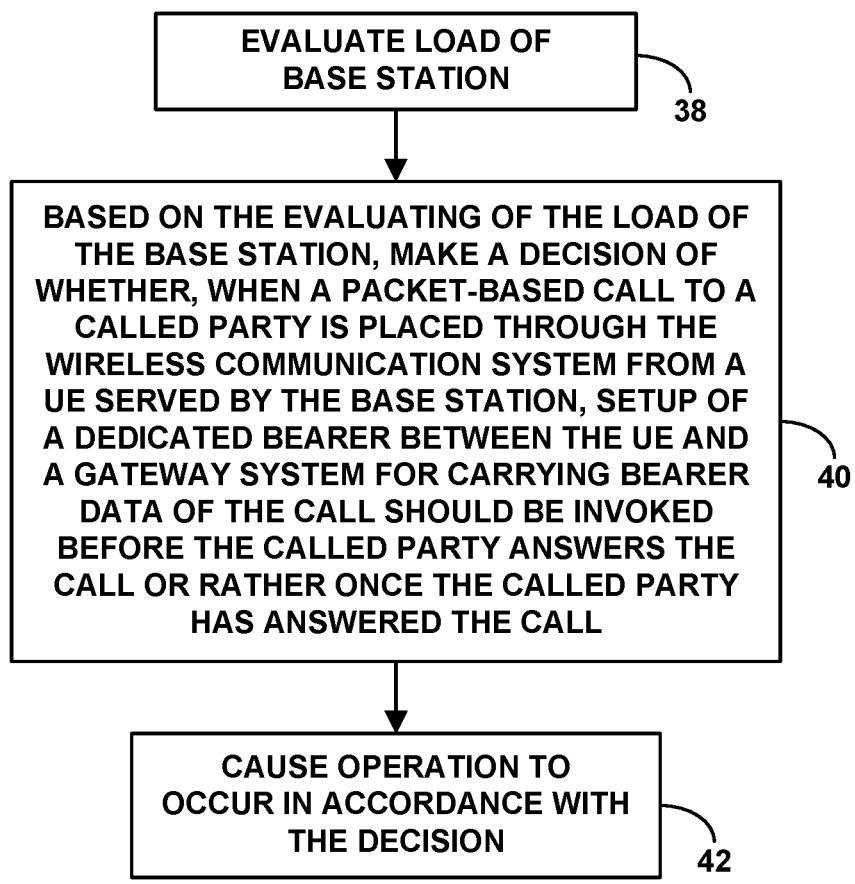
FIG. 3 is another flow chart depicting example operations that can be carried out in accordance with the disclosure.

FIG. 3 is next a flow chart depicting a method for resource management in a wireless communication system, the wireless communication system including a base station and a gateway system, the base station providing coverage in which to serve UEs and having an interface with the gateway system, and the gateway system providing for communication with an IMS. As shown in FIG. 3, at block 38, the method includes evaluating load of the base station. At block 40, the method includes, based on the evaluating of the load of the base station, making a decision of whether, when a packet-based call to a called party is placed through the wireless communication system from a UE served by the base station, setup of a dedicated bearer between the UE and the gateway system for carrying bearer data of the call should be invoked (i) before the called party answers the call or rather (ii) once the called party has answered the call. And at block 42, the method includes causing the wireless communication system to operate in accordance with the decision.

Various features described above can be carried out in this context, and vice versa.

For instance, the act of making the decision based the evaluating of load of the base station could involve (i) if the load of the base station is lower than a predefined threshold, then deciding that the setup of the dedicated bearer should be invoked before the called party answers the call, and (ii) if the load of the base station is not lower than a predefined threshold, then deciding that the setup of the dedicated bearer should be invoked once the called party has answered the call.

Further, as discussed above, the act of invoking setup of the dedicated bearer before the called party answers the call could involve using setup of the dedicated bearer as a precondition for call-setup signaling to the called party.

Still further, the wireless communication system could include a network control entity (e.g., PCRF, MME, or PGW) configured to initiate setup of the dedicated bearer in response to an IMS signal associated with setup of the packet-based call, and causing the wireless communication system to operate in accordance with the decision could involve controlling whether the IMS provides the signal before the called party answers the call or rather once the called party has answered the call. For instance, this could involve (i) if the decision is that setup of the dedicated bearer between the UE and the gateway system should be invoked before the called party answers the call, then causing the IMS to provide the signal before the called party answers the call, and (ii) if the decision is that setup of the dedicated bearer between the UE and the gateway system should be invoked once the called party has answered the call, then causing the IMS to provide the signal if and when the called party has answered the call.

Figure 4:
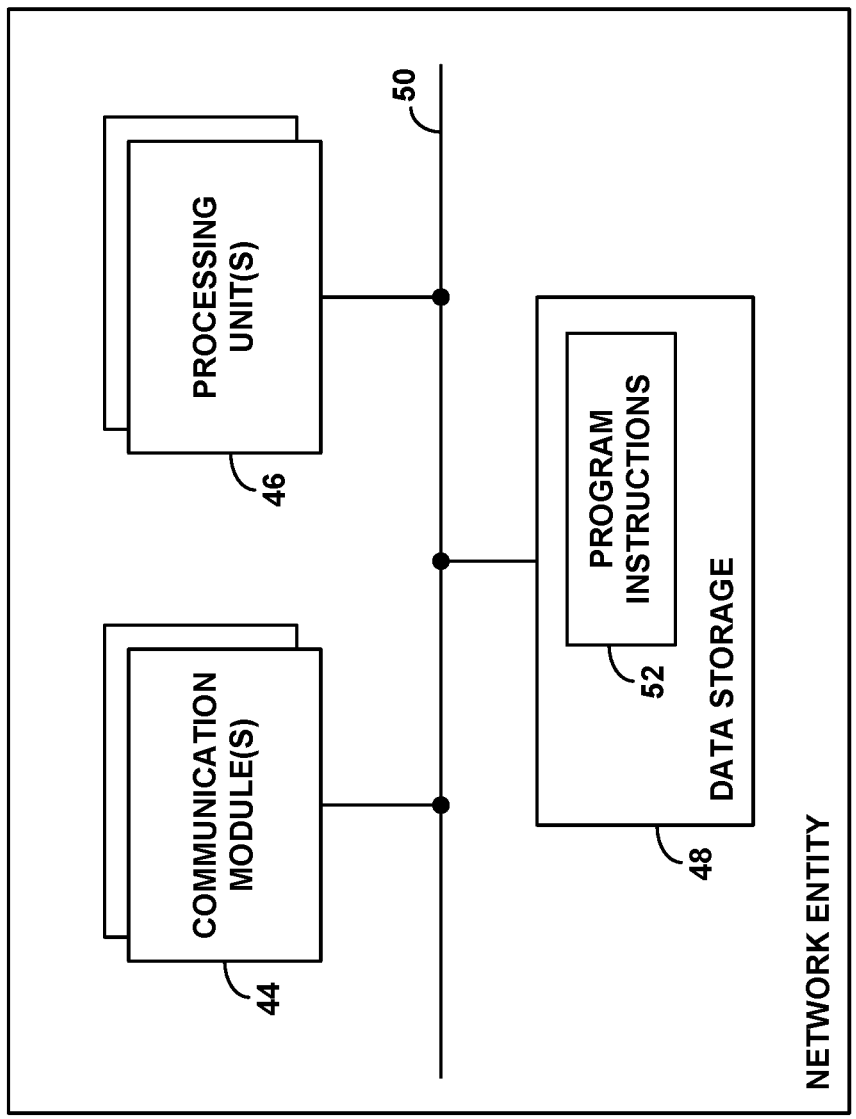
FIG. 4 is a simplified block diagram of an example control system operable in accordance with the disclosure.

Finally, FIG. 4 is a simplified block diagram of control system of a wireless access network, configured to control setup of dedicated bearers in line with the discussion above. In an example implementation, the wireless access network includes a base station, a gateway system, and a control system, the base station providing coverage in which to serve UEs, the gateway system providing connectivity with an IMS, and the control system controlling setup of dedicated bearers within the wireless access network to carry bearer data of communication sessions. The control system could be embodied in a PCRF and/or one or more other entities of the wireless access network.

As shown in FIG. 4, the control system includes one or more communication modules 44, one or more processing units 46, and non-transitory data storage 48, all of which may be integrated together in various ways and/or coupled together by a system bus, network, or other connection mechanism 50.

Communication module(s) 44 could function to provide for wired and/or wireless communication with various other entities. Processing unit(s) 46 could then comprise one or more general purpose processors (e.g., microprocessors) and/or or one or more special-purpose processors (e.g., application specific integrated circuits and/or digital signal processors) configured to carry out various operations described herein. And non-transitory data storage 48 could comprise one or more volatile and/or non-volatile storage components, such as magnetic, optical, or flash storage, integrated in whole or in part with processing unit(s) 46. As shown, data storage could hold program instructions 52, which could be executable by processing unit(s) 46 to carry out various operations described herein.

This or another control system of the wireless access network could be configured to make a decision, based on load of the base station, of whether, when a packet-based call to a called party is placed through the wireless access network from a UE served by the base station, setup of a dedicated bearer for the call should be invoked (i) before the called party answers the call or rather (ii) if and when the called party has answered the call. And the control system could further be configured to operate in accordance with the decision (e.g., to cause the wireless access network and/or IMS to operate in accordance with the decision).

In line with the discussion above, the control system could be configured to respond to a bearer-setup request from the IMS by setting up a dedicated bearer for the packet-based call when the packet-based call is being set up. And the control system could be configured to operate in accordance with the decision at least in part by being configured to transmit to the IMS a control signal that controls timing of when the IMS sends the bearer-setup request to the control system.

More specifically, as discussed above, making the decision, based on load of the base station, of whether setup of the dedicated bearer for the call should be invoked before the called party answers the call or rather if and when the called party has answered the call could involve (i) if the load is lower than a predefined threshold level, then deciding that setup of the dedicated bearer should be invoked before the called party answers the call and (ii) if the load is not lower than the predefined threshold level, then deciding that setup of the dedicated bearer should be invoked if and when the called party has answered the call.

Exemplary embodiments have been described above. Those skilled in the art will understand, however, that changes and modifications may be made to these embodiments without departing from the true scope and spirit of the invention.

We claim:

1. A method for resource management in a wireless access network, wherein the wireless access network includes a base station that provides coverage in which to serve user equipment devices (UEs) and the wireless access network provides connectivity with an Internet Multimedia Subsystem (IMS), the method comprising:
  determining load of the base station; and
  based on the determined load, controlling whether, when a packet-based call is placed from a UE served by the base station to a called party, setup for the UE of a dedicated bearer to carry content of the call through the wireless access network will be invoked (i) before the called party answers the call or rather (ii) if and when the called party has answered the call,
  wherein controlling based on the determined load whether setup of the dedicated bearer will be invoked before the called party answers the call or rather if and when the called party has answered the call comprises (i) if the determined load is lower than a predefined threshold level, then causing setup of the dedicated bearer to be invoked before the called party answers the call and (ii) if the determined load is not lower than the predefined threshold level, then causing setup of the dedicated bearer to be invoked if and when the called party has answered the call.

2. The method of claim 1, wherein setup of the packet-based call from the UE to the called party comprises the UE engaging in call-setup signaling with the IMS via the wireless access network, wherein the IMS is configured to send to the wireless access network a bearer-setup request to request setup of the dedicated bearer for the packet-based call, and wherein controlling whether setup of the dedicated bearer will be invoked before the called party answers the call or rather if and when the called party has answered the call comprises:
  controlling whether the IMS will send the bearer-setup request to the wireless access network (i) before the called party answers the call or rather (ii) if and when the called party has answered the call.

3. The method of claim 2, wherein controlling whether the IMS will send the bearer-setup request to the wireless access network before the called party answers the call or rather if and when the called party has answered the call comprises:
  transmitting to the IMS an indication of whether the IMS should send the bearer-setup request to the wireless access network before the called party answers the call or rather if and when the called party has answered the call.

4. The method of claim 3, wherein the transmitting the indication to the IMS comprises transmitting the indication to the IMS in control-plane signaling between a control entity of the wireless access network and a control entity of the IMS.

5. The method of claim 3, wherein transmitting the indication to the IMS comprises piggybacking the indication onto the call-setup signaling in which the UE engages with the IMS.

6. The method of claim 1, wherein at least the controlling is carried out in response to the packet-based call being placed.

7. The method of claim 1, carried out periodically.

8. The method of claim 1, wherein the coverage provided by the base station defines air-interface resources for carrying communications, and wherein determining the load of the base station comprises determining a percent utilization of the air-interface resources.

9. The method of claim 1, wherein determining the load of the base station comprises determining a quantity of UEs served by the base station.

10. The method of claim 1, wherein invoking setup of the dedicated bearer before the called party answers the call comprises using setup of the dedicated bearer as a precondition for call-setup signaling to the called party.

11. A method for resource management in a wireless communication system, wherein the wireless communication system comprises a base station and a gateway system, the base station providing coverage in which to serve user equipment devices (UEs) and having an interface with the gateway system, and the gateway system providing for communication with an Internet Multimedia Subsystem (IMS), the method comprising:
  evaluating load of the base station;
  based on the evaluating of the load of the base station, making a decision of whether, when a packet-based call to a called party is placed through the wireless communication system from a UE served by the base station, setup of a dedicated bearer between the UE and the gateway system for carrying bearer data of the call should be invoked (i) before the called party answers the call or rather (ii) once the called party has answered the call, wherein making the decision based on the evaluating of load of the base station comprises (i) if the load of the base station is lower than a predefined threshold, then deciding that the setup of the dedicated bearer should be invoked before the called party answers the call and (ii) if the load of the base station is not lower than a predefined threshold, then deciding that the setup of the dedicated bearer should be invoked once the called party has answered the call; and
  causing the wireless communication system to operate in accordance with the decision.

12. The method of claim 11, wherein invoking setup of the dedicated bearer before the called party answers the call comprises using setup of the dedicated bearer as a precondition for call-setup signaling to the called party.

13. The method of claim 11, carried out periodically.

14. The method of claim 11, wherein the wireless communication system includes a network control entity configured to initiate setup of the dedicated bearer in response to an IMS signal associated with setup of the packet-based call, and wherein causing the wireless communication system to operate in accordance with the decision comprises controlling whether the IMS provides the signal before the called party answers the call or rather once the called party has answered the call.

15. The method of claim 14, wherein controlling whether the IMS provides the signal before the called party answers the call or rather once the called party has answered the call comprises:
- if the decision is that setup of the dedicated bearer between the UE and the gateway system should be invoked before the called party answers the call, then causing the IMS to provide the signal before the called party answers the call; and
- if the decision is that setup of the dedicated bearer between the UE and the gateway system should be invoked once the called party has answered the call, then causing the IMS to provide the signal if and when the called party has answered the call.

16. A wireless access network comprising a base station, a gateway system, and a control system, wherein the base station provides coverage in which to serve user equipment devices (UEs), wherein the gateway system provides connectivity with an Internet Multimedia Subsystem (IMS), and wherein the control system controls setup of dedicated bearers within the wireless access network to carry bearer data of communication sessions, the control system being configured to make a decision, based on load of the base station, of whether, when a packet-based call to a called party is placed through the wireless access network from a UE served by the base station, setup of a dedicated bearer for the call should be invoked (i) before the called party answers the call or rather (ii) if and when the called party has answered the call, wherein making the decision, based on load of the base station, of whether setup of the dedicated bearer for the call should be invoked before the called party answers the call or rather if and when the called party has answered the call comprises (i) if the load is lower than a predefined threshold level, then deciding that setup of the dedicated bearer should be invoked before the called party answers the call and (ii) if the load is not lower than the predefined threshold level, then deciding that setup of the dedicated bearer should be invoked if and when the called party has answered the call, and the control system being configured to operate in accordance with the decision.

17. The wireless access network of claim 16,
wherein the control system is configured to respond to a bearer-setup request from the IMS by setting up a dedicated bearer for the packet-based call when the packet-based call is being set up, and
wherein the control system being configured to operate in accordance with the decision comprises the control system being configured to transmit to the IMS a control signal that controls timing of when the IMS sends the bearer-setup request to the control system.

* * * * *